United States Patent
Shen et al.

(10) Patent No.: US 7,263,383 B2
(45) Date of Patent: Aug. 28, 2007

(54) APPARATUS AND A METHOD FOR EXTENDING PHONE BOOK RECORDS OF A SUBSCRIBER IDENTIFICATION MODULE (SIM) CARD

(75) Inventors: Chien-Lin Shen, Shanghai (CN); Tony Tsai, Hsinchu (TW); David Ho, Sanchung (TW)

(73) Assignee: Inventec Appliances Corp., Taipei (TW)

( * ) Notice: Subject to any disclaimer, the term of this patent is extended or adjusted under 35 U.S.C. 154(b) by 409 days.

(21) Appl. No.: 10/940,629

(22) Filed: Sep. 15, 2004

(65) Prior Publication Data

US 2006/0058065 A1  Mar. 16, 2006

(51) Int. Cl.
*H04M 1/00*  (2006.01)
*H04B 1/38*  (2006.01)

(52) U.S. Cl. .................... 455/558; 455/566; 455/550.1

(58) Field of Classification Search ............... 455/558, 455/411, 412.1, 550.1, 566, 410, 557, 90.3, 455/73, 403
See application file for complete search history.

(56) References Cited

U.S. PATENT DOCUMENTS

| | | | | |
|---|---|---|---|---|
| 5,907,804 | A * | 5/1999 | Schroderus et al. | 455/411 |
| 6,062,887 | A * | 5/2000 | Schuster et al. | 439/218 |
| 6,598,142 | B2 * | 7/2003 | Paavilainen et al. | 711/173 |
| 2002/0099846 | A1 * | 7/2002 | Hicks | 709/236 |
| 2003/0046631 | A1 * | 3/2003 | Gappisch et al. | 714/763 |
| 2003/0114192 | A1 * | 6/2003 | Estes et al. | 455/558 |
| 2005/0164737 | A1 * | 7/2005 | Brown | 455/558 |
| 2005/0164738 | A1 * | 7/2005 | Liu | 455/558 |
| 2005/0253554 | A1 * | 11/2005 | DiFazio et al. | 320/114 |

* cited by examiner

*Primary Examiner*—Sonny Trinh
(74) *Attorney, Agent, or Firm*—Troxell Law Office, PLLC

(57) ABSTRACT

An apparatus for extending "phone book" records of a subscriber identification module (SIM) card comprising a detecting module for accessing a subscriber identification code (SIC) of the SIM card and a memory is provided. A storage window marked by the SIC is defined in the memory. As the user edits the "phone book" records of the SIM card, a portion of the records is stored in the marked storage window.

16 Claims, 3 Drawing Sheets

US 7,263,383 B2

APPARATUS AND A METHOD FOR EXTENDING PHONE BOOK RECORDS OF A SUBSCRIBER IDENTIFICATION MODULE (SIM) CARD

BACKGROUND OF THE INVENTION

1. Field of the Invention

This invention relates to an apparatus for extending phone book records of a subscriber identification module (SIM) card and a method for extending the same, and more particularly for extending phone book records of a SIM card by using a flash memory within a mobile phone.

2. Description of Related Art

Mobile communication is made possible by using satellites or widely spreading base stations to receive and transmit communication signals. Users may use mobile end systems, such as a mobile phone, to receive or/and transmit signals from/to the base stations so as to communicate with one at a far distance. In addition, by providing wireless communication between the users and the base stations, the users may talk to other people without positional limitations.

A global system for mobile (GSM) is one of the most popular communication systems nowaday. It characterizes a subscriber identification module (SIM) card appending to a mobile phone for logging in the GSM communication network and thus enabling the mobile communication.

Among various functions provided in the mobile phone, a "phone book" function for storing records of a friend, a relative, a costumer, etc. into a flash memory or the SIM card is of utmost demand. By using the "phone book" function, users may record the home address, the e-mail address, plural of phone numbers, etc. into the so called "phone book", may group and sort the records, and also may set various ring tones and representing photos to individuals.

It should be noted that only the "phone book" within the flash memory of the mobile phone can support abundant records, such as e-mail addresses, home addresses, ring tones, representing photos, etc. Currently, the "phone book" within the SIM card allows only a name and a relative phone number to be recorded due to the limitation of record structure available. Therefore, the only way to extend the old "phone book" records within the SIM card is to reedit a new "phone book" record in the flash memory of the mobile phone so as to replace the old one.

Accordingly, a need of easily extending the present "phone book" records in the SIM card in order to resolve the drawbacks of the dullness and the limitation on such records is rising.

SUMMARY OF THE INVENTION

A main object of the present invention is to provide a method for enriching the "phone book" records of a SIM card.

In a method provided in the present invention, the subscriber identification code (SIC) within the SIM card, which is just plugged into the mobile phone, is firstly detected. Then, a storage window is defined in a memory of the mobile phone and then marked with the SIC. As the user edits the "phone book" records of the SIM card, a portion of the records is stored in the marked storage window.

Reference will now be made in detail to the preferred embodiments of the present invention, examples of which are illustrated in the accompanying drawings. Wherever possible, the same reference numbers will be used throughout the drawings to refer to the same or like parts.

BRIEF DESCRIPTION OF THE DRAWINGS

The present invention will now be specified with reference to its preferred embodiment illustrated in the drawings, in which.

DETAIL DESCRIPTION OF THE PREFERRED EMBODIMENTS

A typical "phone book" record structure in a SIM card is described as follow:

```
typedef struct PhonebookRecordStructOnPhoneTag
{
    Int8          name[SIM_NAME_LEN];        name
    Int8          number[SIM_NUMBER_LEN];    phone number
}PhonebookRecordOnSim
```

A typical "phone book" record structure in the flash memory of the mobile phone is described as follow:

```
typedef struct PhonebookRecordStructOnPhoneTag
{
    AgCharCode    lastName[LASTNAME_MAX_LEN+1];     last name
    AgCharCode    firstName[FIRSTNAME_MAX_LEN+1];   first name
    AgCharCode    mobilePhone[PHONE_MAX_LEN+1];     mobile phone number
    AgCharCode    familyPhone[PHONE_MAX_LEN+1];     family phone number
    AgCharCode    officePhone[PHONE_MAX_LEN+1];     office phone number
```

-continued

| | | |
|---|---|---|
| AgCharCode | beepNumber[PHONE_MAX_LEN+1]; | beep number |
| AgCharCode | faxNumber[PHONE_MAX_LEN+1]; | fax number |
| Int8 | group; | group belongs |
| UINT32 | ringTone; | ring tone |
| UINT32 | photo; | representing photo |
| AgCharCode | email[EMAIL_MAX_LEN+1]; | e-mail address |
| AgCharCode | address[ADDR_MAX_LEN+1] | home address |
| }PhonebookRecordOnPhone | | |

According to the record structures shown above, the "phone book" records in the SIM card only includes a name and a first phone number, whereas the "phone book" records in the flash memory of the mobile phone has a name, a mobile phone number, a family phone number, an office phone number, a beep number, a fax number, a group belongs, a ring tone, a representing photo, an e-mail address, a home address, etc.

Figure 1:
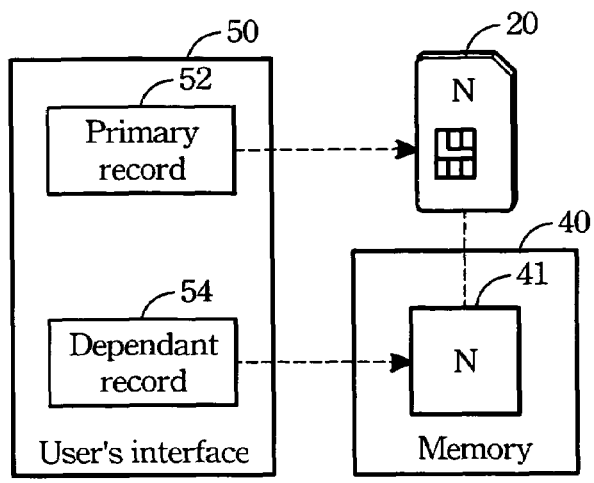
FIG. 1 depicts a block diagram of a preferred embodiment of an apparatus in accordance with the present invention for extending the "phone book" records of the SIM card by using the memory of the mobile phone.

In order to extend the "phone book" records of the SIM card, in a preferred embodiment of an apparatus in accordance with the present invention as shown in FIG. 1, a storage window 41 is defined in a flash memory 40 of the mobile phone for recording some extended records relative to the old "phone book" record in the SIM card 20. In addition, the storage window 41 has a SIC N of the SIM card 20 as a mark to relate to the "phone book" records in the SIM card.

According to the mentioned apparatus, it is noted that the edited or input "phone book" records by using an user's friendly interface 50 are divided into two portions, primary records 52 stored to the SIM card 20 and dependent records 54 stored to the storage window 41. The primary records 52 include a name and a first phone number. However, the dependent records 54 include a second phone number, a third phone number, a fourth phone number, a ring tone, a specified photo, an e-mail address, a home address, an office address, a memo, and even more any regarding to the need. Therefore, the "phone book" records of the SIM card 20 are extended, and even a characterized ring tone or photo can be also feasible.

Figure 2:
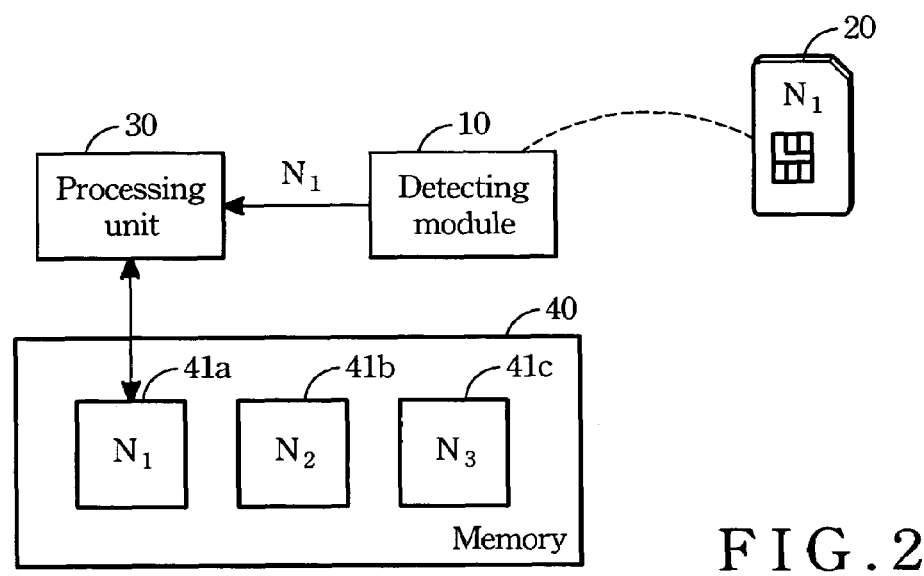
FIG. 2 depicts a block diagram of a preferred embodiment of an apparatus in accordance with the present invention for extending the "phone book" records of the SIM card, while a defined storage window marked by the SIC of the SIM card has been formed in the memory of the mobile phone.

In the case that the flash memory 40 of the mobile phone has more than one defined storage window, for example three storage windows 41a, 41b, and 41c as shown in FIG. 2, a detecting module 10 is utilized to access the SIC N1 of the SIM card 20 plugged into the mobile phone. The accessed SIC N1 is then delivered to a processing unit 30 of the mobile phone. The processing unit 30 checks the marked storage windows 41a, 41b, and 41c in the flash memory 40, and identifies the one 41a having the identical SIC N1 with respect to that of the SIM card 20. Thereby, the input dependent records, described in the above paragraph, related to the SIM card 20 can be stored to or read from the correct storage window 41a.

Figure 5:
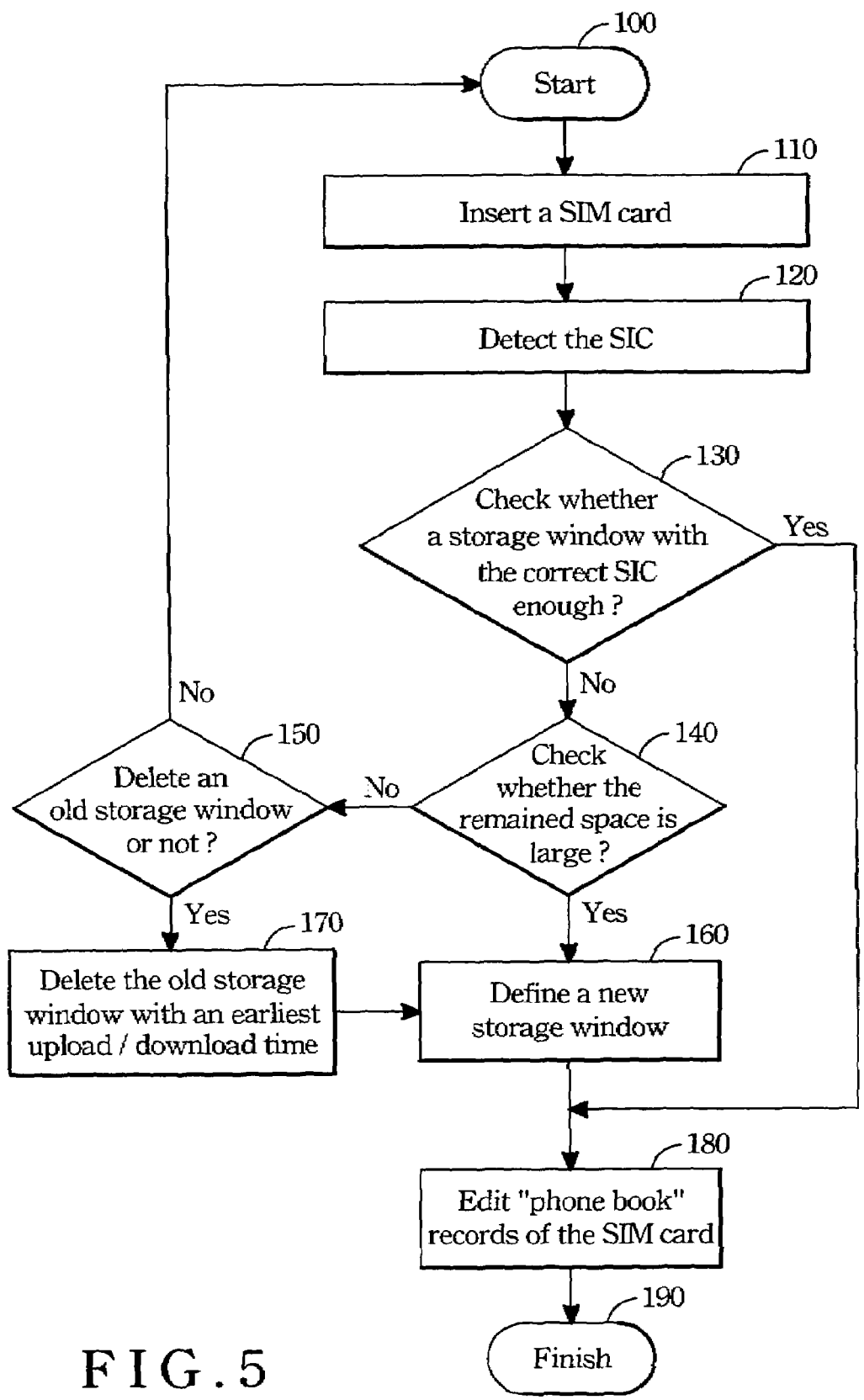
FIG. 5 depicts a flow chart of a preferred embodiment of a method in accordance with the present invention for extending "phone book" records of the SIM card.

By using the apparatus of FIG. 2, a preferred embodiment of a method for extending the phone book records of the SIM card 20 in accordance with the present invention is described below. Referring to FIG. 2 and FIG. 5, after the SIM card 20 is plugged into a SIM card slot (not shown) of the mobile phone (step 110), the detecting module 10 detects the SIM card 20 and accesses the SIC N1 of the SIM card 20 (step 120). Then, as a command of reading or editing the "phone book" records of the SIM card 20 is executed, the processing unit 30 of the mobile phone checks the SICs N1, N2, and N3 marking the exist storage windows 41a, 41b and 41c in the flash memory 40 of the mobile phone (step 130).

If one of the SICs N1, N2, and N3 matches the SIC N1 of the SIM card 20, the processing unit 30 may combine the records in the storage window 41a with the matched SIC N1 and the "phone book" records in the SIM card 20, and then show the combined result on a displaying panel (not shown) of the mobile phone (step 180).

Figure 3:
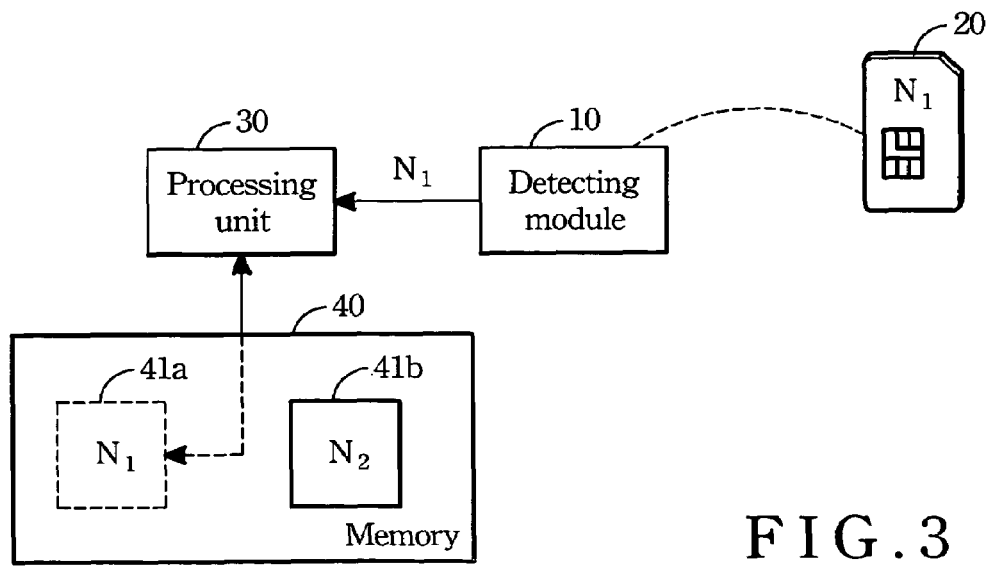
FIG. 3 depicts a block diagram of a preferred embodiment of an apparatus in accordance with the present invention for extending the "phone book" records of the SIM card, while no defined storage window marked by the SIC of the SIM card has been formed in the memory with enough remained space.

Referring to FIG. 3 and FIG. 5, in step 130, as the SIC N2 marking the storage window 41b in the flash memory 40 cannot matches the SIC N1 of the SIM card 20, or even as no storage windows has been defined in the flash memory 40, the processing unit 30 may check if the flash memory 40 has enough space available for allocating a storage window or not (step 140). If yes, the processing unit 30 may map the flash memory 40 to define an empty storage window 41a in the remained space, and then store the SIC N1 of the SIM card 20 to the empty storage window 41a as a mark (step 160). As the "phone book" records of the SIM card 20 are edited, the processing unit 30 may deal with the input records and store the dependent records (also the extended portion with respect to the "phone book" in the SIM card 20) to the empty storage window 41a (step 180).

Figure 4A:
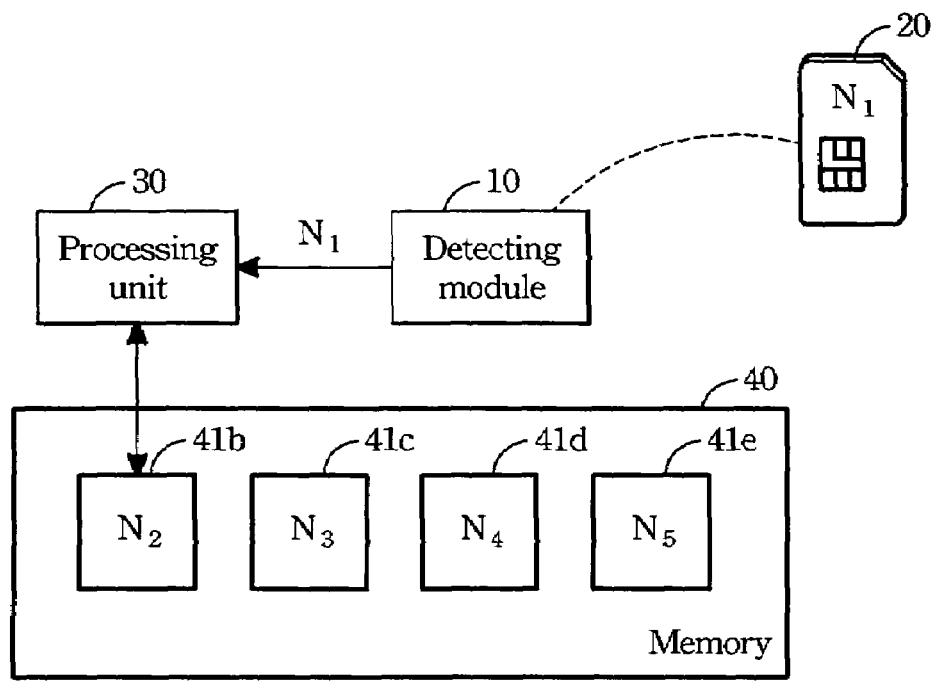
FIGS. 4A and 4B depict block diagrams of a preferred embodiment of an apparatus in accordance with the present invention for extending the "phone book" records of the SIM card, while no defined storage window marked by the SIC of the SIM card has been formed in the memory with no enough remained space.
Figure 4B:
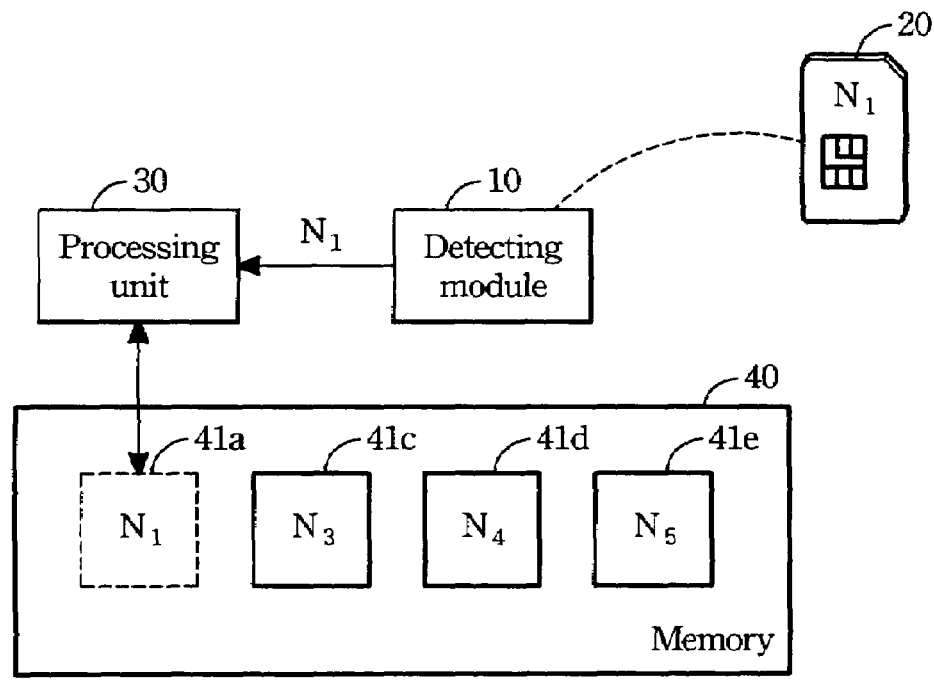

Referring to FIG. 4A and FIG. 5, as all the SICs N2, N3, N4, and N5 relatively marking the storage windows 41b, 41c, 41d, and 41e in the flash memory 40 cannot match the SIC N1 of the SIM card 20 (step 130) and as the flash memory 40 is filled (step 140), the processing unit 30 may determine which storage window has an earliest download/upload time. Then, the processing unit 30 may create an inquiry to delete the storage window 41b with the earliest download/upload time so as to release memory space (step 150). If so, as shown in FIG. 4B, the processing unit 30 deletes the storage window 41b with the earliest download/upload time (step 170), and then allocates an empty storage window 41a in the flash memory 40 so as to store the SIC N1 of the SIM card 20 into the empty storage window 41a as a mark (step 180).

The apparatus and the method for extending the "phone book" records of the SIM card 20 in accordance with the present invention has the following advantages:

1. The old "phone book" records in the SIM card 20 may be enriched in accordance with the present invention, and also some specific ring tones and representing photos for identifying the users can be recorded.

2. The old "phone book" records in the SIM card 20 may be extended without the need of changing the record structure of the "phone book" in the SIM card 20.

3. As the "phone book" records of the SIM card 20 is read or edited, a storage window 41 respective to the SIM card 20 is defined in the flash memory 40 of the mobile phone automatically. Therefore, a friendly usage is achievable.

4. A plurality of storage windows 41 may be defined in the single flash memory 40 of the mobile phone by marking each storage window 41 with a specific SIC. Therefore, the method and apparatus in accordance with the present invention can be applied to the situation of multi SIM cards 20.

With the example and explanations above, the features and spirits of the invention will be hopefully well described. Those skilled in the art will readily observe that numerous modifications and alterations of the device may be made when retaining the teaching of the invention. Accordingly, the above disclosure should be construed as limited only by the metes and bounds of the appended claims.

What is claimed is:

1. An apparatus for extending phone book records of a SIM card, comprising:
   a detecting module for detecting a subscriber identification code (SIC) of the SIM card; and
   a memory having a storage window marked by the SIC;
   wherein, while in editing the phone book records of the SIM card, a processing unit of the mobile phone sorts the edited phone book records into primary records stored in the SIM card and dependent records stored in the storage window, and checks all the storage windows and looks for the storage window marked with the SIC of the SIM card.

2. The apparatus of claim 1, wherein the primary records comprising a name and a first phone number.

3. The apparatus of claim 1, wherein the dependent records comprising a second phone number, a third phone number, a forth phone number, a ring tone, a representing photo, an e-mail address, a home address, an office address, and a memo.

4. The apparatus of claim 1, wherein the storage window is marked by storing the SIC of the SIM card.

5. A method for extending phone book records of a SIM card, comprising the steps of:
   detecting a SIC of the SIM card; and
   defining a storage window in a memory of a mobile phone and marking the storage window with the SIC;
   wherein, while in editing the phone book records of the SIM card, the edited phone book records are sorted into primary records and dependent records, the primary records are stored in the SIM card, the dependent records are stored in the storage window, and a Processing unit of the mobile Phone checks all the storage windows and looks for the storage window marked with the SIC of the SIM card.

6. The method of claim 5, wherein the primary records comprising a name and a first phone number.

7. The method of claim 5, wherein the dependent records comprising a second phone number, a third phone number, a fourth phone number, a ring tone, a specified photo, an e-mail address, a home address, an office address, and a memo.

8. The method of claim 5, wherein, as all the SICs marking the storage windows in the memory cannot match the SIC of the SIM card, a storage window marked by the SIC of the SIM card is defined in a remained space of the memory.

9. The method of claim 8, wherein, as the memory of the mobile phone is filled, the processing unit searches the storage window with an earliest download/upload time and creates an inquiry to delete the storage window with the earliest download/upload time so as to release a space for allocating a storage window marked with the SIC of the SIM card.

10. An apparatus for extending phone book records of a SIM card, comprising:
    a detecting module for detecting a subscriber identification code (SIC) of the SIM card; and
    a memory having a storage window marked by the SIC;
    wherein, while in editing the phone book records of the SIM card, a processing unit of the mobile phone sorts the edited phone book records into primary records stored in the SIM card and dependent records stored in the storage window, and the phone book records in the SIM card and the phone book records in the storage window are combined and shown on a displaying panel of the mobile phone simultaneously.

11. The apparatus of claim 10, wherein the primary records comprising a name and a first phone number.

12. The apparatus of claim 10, wherein the dependent records comprising a second phone number, a third phone number, a forth phone number, a ring tone, a representing photo, an e-mail address, a home address, an office address, and a memo.

13. The apparatus of claim 10, wherein the storage window is marked by storing the SIC of the SIM card.

14. A method for extending phone book records of a SIM card, comprising the steps of:
    detecting a SIC of the SIM card; and
    defining a storage window in a memory of a mobile phone and marking the storage window with the SIC;
    wherein, while in editing the phone book records of the SIM card, the edited phone book records are sorted into primary records and dependent records, the primary records are stored in the SIM card, the dependent records are stored in the storage window, and the phone book records in the SIM card and the phone book records in the storage window are combined and shown on a displaying panel of the mobile phone simultaneously.

15. The method of claim 14, wherein the primary records comprising a name and a first phone number.

16. The method of claim 14, wherein the dependent records comprising a second phone number, a third phone number, a fourth phone number, a ring tone, a specified photo, an e-mail address, a home address, an office address, and a memo.

* * * * *